May 21, 1968  P. E. PERLMAN ET AL  3,384,004
COFFEEMAKER
Filed Nov. 26, 1965  2 Sheets-Sheet 1
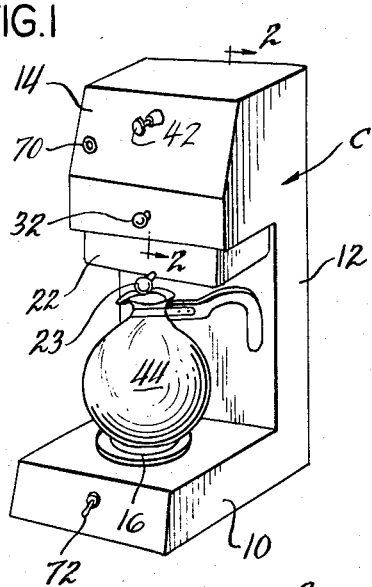
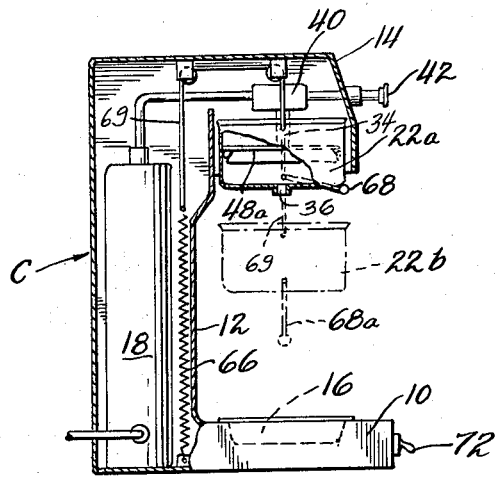
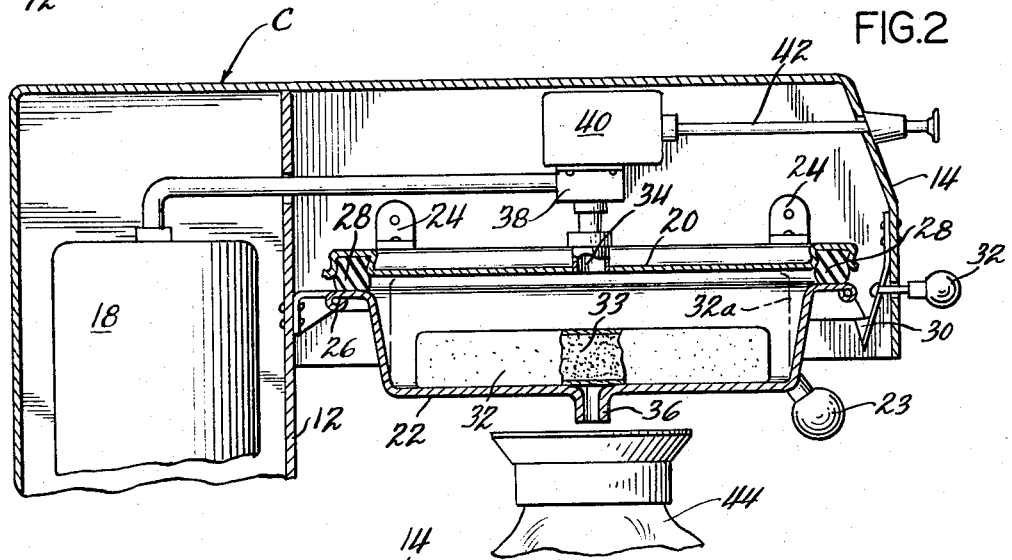
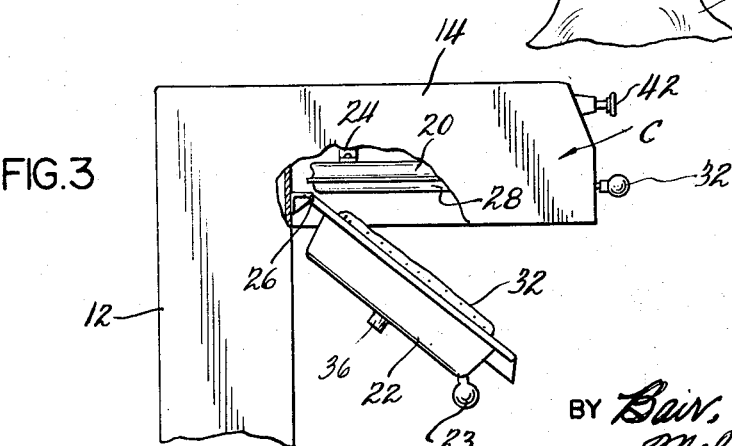
INVENTORS
PAUL E. PERLMAN
HENRY S. PERLMAN
BY Bair, Freeman & Molinare ATTORNEYS May 21, 1968 P. E. PERLMAN ET AL 3,384,004
COFFEEMAKER
Filed Nov. 26, 1965 2 Sheets-Sheet 2
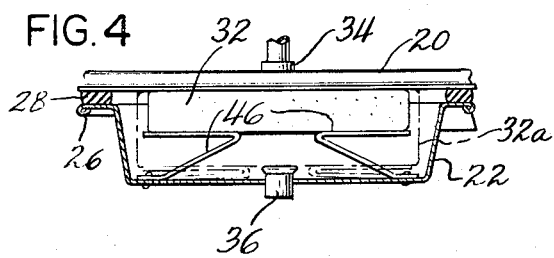
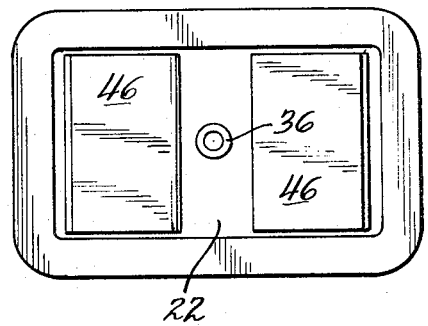
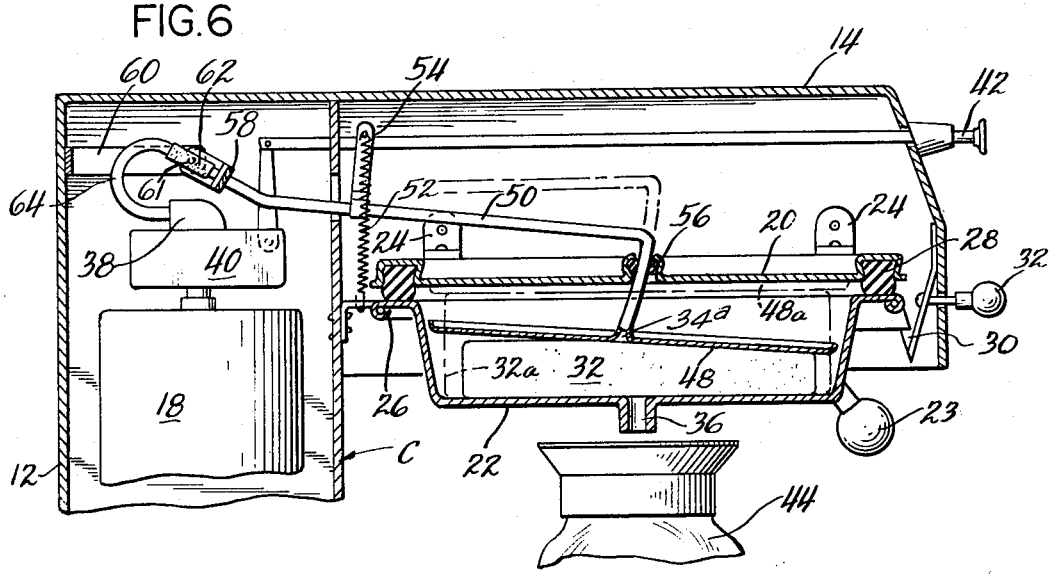
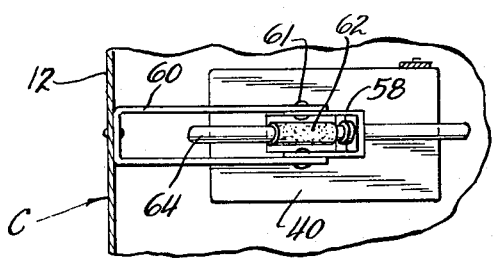
INVENTORS
PAUL E. PERLMAN
HENRY S. PERLMAN
BY *Bair, Freeman & Molinare* ATTORNEYS

UNITED STATES PATENT OFFICE 3,384,004
Patented May 21, 1968

3,384,004
COFFEEMAKER
Paul E. Perlman, Wilmette, and Henry S. Perlman, Deerfield, Ill., assignors to Hill-Shaw Company, Chicago, Ill., a corporation of Illinois
Filed Nov. 26, 1965, Ser. No. 509,744
6 Claims. (Cl. 99—289)

ABSTRACT OF THE DISCLOSURE

A coffeemaker having a brewing chamber for receiving a filter paper bag of coffee and further comprising a spreader plate in contact with the bag and including means for discharging hot water through the filter paper bag. At least one of the side surfaces of the filter paper bag spaced from the side walls of the brewing chamber during both the dry and wet condition of the filter paper bag so as to avoid sealing engagement therebetween. The fluid distribution path within the bag is such that the brewed coffee flows partially out of the opposite surface of the bag and partially out of a side surface of the bag to avoid channeling of the coffee grounds and thereby optimize the extraction rate of the brewed coffee.

---

This invention relates to a coffeemaker of the type having a brewing chamber in which a filter bag of ground coffee may be placed, and hot water then supplied to flow through the bag and its contents for brewing a quantity of coffee.

The principal object of our present invention is to provide a brewing chamber or support for positioning a filter bag of ground coffee between a hot water inlet and a brewed coffee outlet wherein the incoming hot water is injected directly and substantially entirely into the bag. Once the bag and its contents have been initially swelled by water (the bag is maintained in engaged relation against the water inlet to confine the continuing incoming flow of water directly into the bag for passage through the contents of the bag, as distinguished from those prior types of coffeemakers where hot water is directed on or toward the bag in such a way as to permit the water throughout the brewing cycle to run off or around the surface of the bag to the outlet, thereby producing weak coffee because substantially all of the hot water has not passed directly through the ground coffee. This brewing operation can be performed by various structural embodiments of the invention.

For example, one form of invention contemplates the size of the brewing chamber being substantially the size of the coffee bag and its contents when in wet state, thus insuring contact of the bag with the inlet of the brewing chamber.

Another form of the invention permits some variation in the size of the filter bag of ground coffee, the brewing chamber being effectively adjustable in size to accommodate the bag of coffee as by the inclusion of resilient means within the brewing chamber to bias the bag against the hot water inlet, the resilient means being effective to maintain such contact as the bag of coffee swells.

A further form of the invention is one in which a pressure plate is provided within the brewing chamber with which the inlet to the chamber is connected, the pressure plate being movable within the chamber to engage one surface of the bag of coffee with the discharge end of the hot water inlet, and means being provided to bias the pressure plate towards the bag.

Still a further form contemplates a brewing chamber, the effective size of which is adjustable, wherein the brewing chamber is biased toward small size to effect contact of the outlet end of the hot water inlet and the brewing chamber outlet with opposed surfaces of the bag, and to maintain such contact as the bag swells and tends to enlarge the effective size of the brewing chamber against such bias.

In addition to the foregoing objectives, we disclose apparatus which accomplishes a novel coffee brewing method comprising the steps of positioning a filter bag of ground coffee between hot water supply means and brewed coffee discharge means, the supply of hot water to the bag and its contents from the hot water supply means, the confining of such hot water so that it is injected directly and substantially entirely in and through the bag, and the discharge of the coffee thereby brewed through the brewed coffee discharge means.

With these and other objectives in view, our invention consists in the construction, arrangement and combination of the various parts of our coffeemaker, and a coffee brewing method whereby the objects above contemplated are attained, as hereinafter more fully set forth, pointed out in our claims and illustrated in detail on the accompanying drawings, wherein:

FIG. 1 is a perspective view of a coffeemaker embodying our invention;

FIG. 2 is an enlarged sectional view on the line 2—2 of FIG. 1 showing details of the brewing chamber and the apparatus in operating position;

FIG. 3 is a side elevation on a reduced scale showing the brewing chamber opened for the removal of a spent coffee bag and the insertion of a fresh one;

FIG. 4 is a sectional view similar to a portion of FIG. 2 showing a modified form of brewing chamber;

FIG. 5 is a plan view of the bottom member of the brewing chamber shown in FIG. 4;

FIG. 6 is a sectional view similar to FIG. 2 showing another modification;

FIG. 7 is an enlarged detail, showing in plan view a portion of FIG. 6, and

FIG. 8 is a reduced sectional view similar to FIG. 2 showing still another modified form of our invention.

On the accompanying drawings we have used the reference character C to indicate in general a casing for the mechanism of our coffeemaker. The casing C has a bottom portion 10, an upright portion 12 and a top portion 14. Within the portion 10 is a "keeps warm" heating element 16 and within the portion 12 is a water heater or hot water tank 18. The portion 14 of the casing C partially houses a brewing chamber comprising a top part 20 and a bottom part 22. The part 20 is stationary relative to the top portion 14 of the casing C, being mounted thereon as by brackets 24, and the bottom part 22 of the brewing chamber is openable relative to the top part 20 as by hinging as indicated at 26. The brewing chamber 20, 22 may be sealed in closed position by means of a suitable gasket or O-ring 28 retained by the upper portion 20 as illustrated in FIG. 2. A latch 30 is illustrated for retaining the brewing chamber in closed condition and may be released through the medium of a pull-knob 32 so that the brewing chamber can be opened as shown in FIG. 3. The bottom part 22 may be provided with a knob 23 for convenience in opening and closing the brewing chamber.

The brewing chamber 20, 22 is adapted to contain a filter bag of ground coffee 32 which in the dry state incompletely fills the chamber as illustrated by solid lines in FIG. 2 but when swelled up by water contacting the coffee in the bag assumes the shape shown by dot-and-dash lines and indicated 32ª. The ground coffee is indicated 33 in FIG. 2. The top part 20 of the brewing chamber is provided with a hot water inlet 34 and the bottom part 22 is provided with a brewed coffee outlet 36.

When the coffee bag 32 is initially inserted and is in dry state, it rests against the outlet 36 and hot water discharged from the inlet 34 is to some extent held from direct flow through the outlet. When the bag swells up to the size shown at 32ª (which takes but a few seconds), it seals against the inlet 34 so that thereafter the incoming water is positively confined to flow through the coffee in the bag instead of bypassing around the outside surface of the bag from the inlet to the outlet.

The inlet 34 may be supplied with hot water from the water heater or hot water tank 18 through a control valve 38 which may be provided with measuring or timing means 40, the operation of which is initiated by a push rod 42. Accordingly, the coffeemaker is operated by inserting the filter bag of ground coffee 32 in the brewing chamber 20, 22 while the parts are in the position illustrated in FIG. 3, closing the chamber to the latched-closed position of FIG. 2, and then pushing the push rod 42 whereupon a measured amount of hot water, or hot water for a predetermined time period, will flow through the brewing chamber and be discharged at 36 into a suitable serving decanter or the like 44. During the first few seconds of the brewing operation, the bag will swell up to the size shown at 32ª and thereafter we are insured of the hot water flowing properly through the contents of the bag for extracting the maximum amount and strength of brewed coffee therefrom.

The size of the brewing chamber 20, 22 is preferably approximately that of the bag 32 when its contents are in the wet state and therefore in swelled condition. Accordingly, for most efficient operation, the size of the coffee bag must be tailored to the size of the brewing chamber. If the chamber is too large, the bag cannot seal against the inlet 34 whereas if it is too small, undue pressure is exerted within the chamber causing the ground coffee 33 to become unduly packed which restricts the flow of water through it.

In FIGS. 4 and 5 we show a modification in which the relative sizes of the bag and the chamber are not so critical. Biasing means such as leaf springs 46 are provided which initially maintain the bag in contact with the inlet 34 yet permit the bag to swell as shown by dot-and-dash lines 32ª while maintaining the seal against the inlet.

In FIGS. 6 and 7 we show another modification wherein a pressure plate 48 is carried by a hot water pipe 50 in such manner that it may be biased downwardly by a spring 52 connected to a bracket 54 of the pipe. The bag of coffee 32 in dry state is contacted by the pressure plate and the discharge end 34ª of the pipe 50, which constitutes the hot water inlet for the brewing chamber, is thereby held in contact with the bag both when in the dry state and when in the wet state indicated by dot-and-dash lines 32ª, the pressure plate 48 thereupon being in the position shown at 48ª. A suitable seal 56 such as an O-ring may be provided for the pipe 50 with respect to the top portion 20 of the brewing chamber.

The left-hand end of the pipe 50 is shown supported by a U-shaped bracket 58 pivoted at 61 to a stationary U-shaped bracket 60, a length of flexible tubing such as rubber hose or the like 62 connecting the pipe 50 to another pipe 64 extending from the water valve 38 and the measuring or timing mechanism 40.

Still another modification is shown in FIG. 8 wherein there is a stationary pressure plate 48ᵇ and a cylindrical brewing chamber 22ª which can telescope thereover with a suitable O-ring or other type of seal between the two. The chamber 22ª is biased upwardly by a pair of springs 66 and may be provided with a bail 68 for opening the chamber as to the dot-and-dash line position shown at 22ᵇ, 68ª for removing a spent bag of ground coffee and replacing it with a fresh one. Flexible cords 69 and a pulley arrangement such as illustrated may be provided for operatively connecting the brewing chamber part 22ᵇ to the springs 66.

FIGS. 1 and 8 show a pilot light 70 for indicating energization of the water heater 18 and the heating element 16, and a switch 72 for controlling the flow of current to them.

From the foregoing specification it will be obvious that we have provided a coffeemaker of the type having an openable brewing chamber adapted to receive a filter bag of ground coffee wherein means is provided to insure that the hot water will pass through the contents of the filter bag without bypassing it. Desirable operation of this type is achieved from start to finish of the brewing operation during the time that the bag is in dry state as well as in wet state.

Some changes may be made in the construction and arrangement of the parts of our coffeemaker and our coffee brewing method can be varied to some extent without departing from the real spirit and purpose of our invention and it is our intention to cover by our claims any modified forms of structure, use of mechanical equivalents or modifications of our method which may reasonably be included within their scope.

We claim as our invention:

1. The improvement of a coffeemaker comprising the combination of:
   (a) a brewing chamber having side walls and a bottom wall for receiving a filter paper bag of coffee therein,
   (b) a filter paper bag of coffee having top, bottom and side surfaces,
   (c) the walls of said brewing chamber being dimensioned for receiving said filter paper bag therewithin such that at least one of said side surfaces is spaced from the side walls of said brewing chamber during both the dry and wet condition of said filter paper bag so as to avoid sealing engagement therebetween.
   (d) a spreader plate positioned in contacting engagement with one surface of said filter paper bag, said spreader plate having a hot water discharge inlet port,
   (e) a brewed coffee outlet port in a wall of said brewing chamber,
   (f) hot water supply means,
   (g) a hot water conduit connecting said hot water supply means and said hot water discharge inlet port to permit hot water to be introduced at one surface of the filter paper bag and the brewed coffee to flow partially out of the opposite surface of said bag and partially out of a side surface of said bag to said outlet port to avoid channeling of the coffee within said bag and thereby to optimize the extraction rate of the brewed coffee,
   (h) and means to resiliently bias said spreader plate and said filter paper bag into contact with each other during both the wet and dry condition of said filter paper bag and independently of variations in the thickness of said filter paper bag.

2. The improvement of a coffeemaker in accordance with claim 1 wherein said spreader plate is formed of rigid material and is in firm engagement with said filter paper bag at its points of contact therewith.

3. The improvement of a coffeemaker in accordance with claim 1 further comprising means for mounting said spreader plate so as to be movable away from said brewing chamber to facilitate the insertion and removal of said paper filter bag therein.

4. The improvement of a coffeemaker in accordance with claim 1 in which said resiliently biasing means comprises a supporting insert mounted within said brewing chamber for supporting said filter paper bag therewithin such that at least one said surface of said paper filter bag is spaced from the said walls of said brewing chamber.

5. The improvement of a coffeemaker in accordance with claim 4 wherein said support insert comprises a plurality of arms.

6. The improved method for brewing coffee in a coffeemaker of the type utilizing a filter paper bag of coffee comprising the steps of
   (a) positioning the filter paper bag within a brewing chamber of the coffeemaker such that at least one side surface of the filter paper bag is spaced from the walls of the brewing chamber during both the dry and wet condition of the bag so as to avoid sealing engagement between said bag one side surface and said brewing chamber walls, (b) resiliently biasing a spreader plate having a hot water inlet port into contact with said filter paper bag during both the wet and dry condition of said filter paper bag and independently of variations in the thickness of said filter paper bag, (c) discharging hot water through said hot water inlet port into said filter paper bag for brewing coffee therein and causing the brewed coffee to flow out of a plurality of surfaces of said filter paper bag, including said one side surface, so as to avoid channeling of the coffee grounds within said filter paper bag, and (d) causing said brewed coffee to flow out of said brewing chamber into a receptacle.

References Cited
UNITED STATES PATENTS

| | | | |
|---|---|---|---|
| 2,451,195 | 10/1948 | Brown | 99—295 |
| 2,778,739 | 1/1957 | Rodth | 99—295 |
| 2,899,886 | 8/1959 | Rodth | 99—295 |
| 3,030,874 | 4/1962 | Fiori | 99—295 X |
| 3,143,954 | 8/1964 | Nesmith | 99—283 X |
| 3,209,676 | 10/1965 | Zimmermann et al. | 99—283 X |
| 3,295,998 | 1/1967 | Goros | 99—282 |
| 2,620,088 | 12/1952 | Tellander. | |

WALTER A. SCHEEL, *Primary Examiner.*

J. M. NEARY, *Assistant Examiner.*